United States Patent
Lin

(10) Patent No.: US 10,719,717 B2
(45) Date of Patent: Jul. 21, 2020

(54) SCAN FACE OF VIDEO FEED

(71) Applicants: LONGSAND LIMITED, Cambridge (GB); Qian Lin, Sunnyvale, CA (US)

(72) Inventor: Qian Lin, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 15/560,275

(22) PCT Filed: Mar. 23, 2015

(86) PCT No.: PCT/US2015/022087
§ 371 (c)(1),
(2) Date: Sep. 21, 2017

(87) PCT Pub. No.: WO2016/153479
PCT Pub. Date: Sep. 29, 2016

(65) Prior Publication Data
US 2018/0075307 A1    Mar. 15, 2018

(51) Int. Cl.
| | |
|---|---|
| G06K 9/00 | (2006.01) |
| G06F 16/583 | (2019.01) |
| H04N 5/232 | (2006.01) |
| G06T 7/292 | (2017.01) |
| G06T 7/246 | (2017.01) |
| G06K 9/62 | (2006.01) |

(52) U.S. Cl.
CPC ..... *G06K 9/00778* (2013.01); *G06F 16/5838* (2019.01); *G06K 9/00255* (2013.01); *G06K 9/00295* (2013.01); *G06K 9/00711* (2013.01); *G06T 7/248* (2017.01); *G06T 7/292* (2017.01); *H04N 5/23206* (2013.01); *H04N 5/23219* (2013.01); *G06K 9/6267* (2013.01); *G06K 2009/00738* (2013.01); *G06T 2207/10016* (2013.01); *G06T 2207/20076* (2013.01); *G06T 2207/30201* (2013.01); *G06T 2207/30232* (2013.01); *G06T 2207/30241* (2013.01)

(58) Field of Classification Search
CPC ........................................ G06K 2009/00738
See application file for complete search history.

(56) References Cited

U.S. PATENT DOCUMENTS

| | | | |
|---|---|---|---|
| 8,284,258 B1 | 10/2012 | Cetin et al. | |
| 9,161,084 B1 * | 10/2015 | Sharma | G06K 9/00778 |

(Continued)

FOREIGN PATENT DOCUMENTS

| | | |
|---|---|---|
| CN | 102970517 A | 3/2013 |
| WO | WO2009079809 A1 | 7/2009 |
| WO | WO-2009079809 A1 | 7/2009 |

OTHER PUBLICATIONS

Watanabe, K. et al., "Development of Video Surveillance Device," (Research Paper), Apr. 2013, pp. 90-93, available at http://global-sei.com/tr/pdf/info/76-15.pdf.

(Continued)

*Primary Examiner* — Oneal R Mistry

(57) ABSTRACT

Crowd behavior in a video feed may be analyzed based on movement of a human object identified in the video feed. An abnormal event may be triggered if the movement of the human object deviates from the analyzed crowd behavior. A camera may scan a face of the human object, if the abnormal event is triggered.

11 Claims, 3 Drawing Sheets

(56) References Cited

U.S. PATENT DOCUMENTS

| | | | |
|---|---|---|---|
| 9,762,865 B2* | 9/2017 | Carey | H04N 7/181 |
| 9,922,256 B2* | 3/2018 | Savvides | G06K 9/00771 |
| 2003/0086496 A1* | 5/2003 | Zhang | G06K 9/00711 |
| | | | 375/240.16 |
| 2005/0104958 A1 | 5/2005 | Egnal et al. | |
| 2008/0201116 A1 | 8/2008 | Ozdemir et al. | |
| 2009/0040302 A1 | 2/2009 | Thompson | |
| 2014/0037138 A1* | 2/2014 | Sato | G08G 1/166 |
| | | | 382/103 |
| 2014/0152821 A1 | 6/2014 | Fu et al. | |
| 2014/0313330 A1 | 10/2014 | Carey | |
| 2014/0372348 A1 | 12/2014 | Lehmann et al. | |

OTHER PUBLICATIONS

International Searching Authority., International Search Report and Written Opinion dated Dec. 22, 2015 for PCT Application No. PCT/US2015/022087 Filed Mar. 23, 2015, 13 pgs.

* cited by examiner

SCAN FACE OF VIDEO FEED

BACKGROUND

Equipment, such as security cameras, is used to provide surveillance video, especially in public areas. Providing more effective methods to identify people in video surveillance video from security cameras is becoming increasingly important.

BRIEF DESCRIPTION OF THE DRAWINGS

The following detailed description references the drawings, wherein.

DETAILED DESCRIPTION

Specific details are given in the following description to provide a thorough understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

Most of the existing surveillance cameras capture video of a fixed location at a fixed resolution. New generation of Pan, Tilt, and Zoom (PTZ) cameras may be controlled to record videos in a wider area by panning and tilting the camera, or in a smaller area at a higher resolution by zooming in. Traditionally, PTZ cameras have been controlled either manually or via simple logic such as detecting faces and zooming in to faces or static speed thresholds for human walking. Further, such methods may be difficult to scale for a large number of cameras.

Examples may provide a system that controls PTZ cameras by actively analyzing the crowd behavior in the video. Upon detecting unusual behaviors, examples may start automatic scanning of the faces to create a record of the people present at the event.

In one example, the system may include an analysis unit and an event unit. The analysis unit may analyze crowd behavior in a video feed based on movement of a human object identified in the video feed. The event unit may trigger an abnormal event if the movement of the human object deviates from the analyzed crowd behavior. A camera may scan a face of the human object, if the abnormal event is triggered.

Thus, examples may describe an adaptive system to detect anomalies by analyzing the statistics of human body movement observed by cameras. Examples may not require manual steps for calibration. In addition, examples may integrate with a PTZ camera's pan, tilt, and zoom function with human body detection and tracking result allows the scanning of faces at high resolution once anomalies are detected. The face images as well as the associated appearance time and location data may provide a relatively fast way to index and search videos captured by a large number of cameras at an event location as well as adjacent areas. In addition, the faces may also be used to match with existing databases to obtain the identities of the face images.

Figure 1:
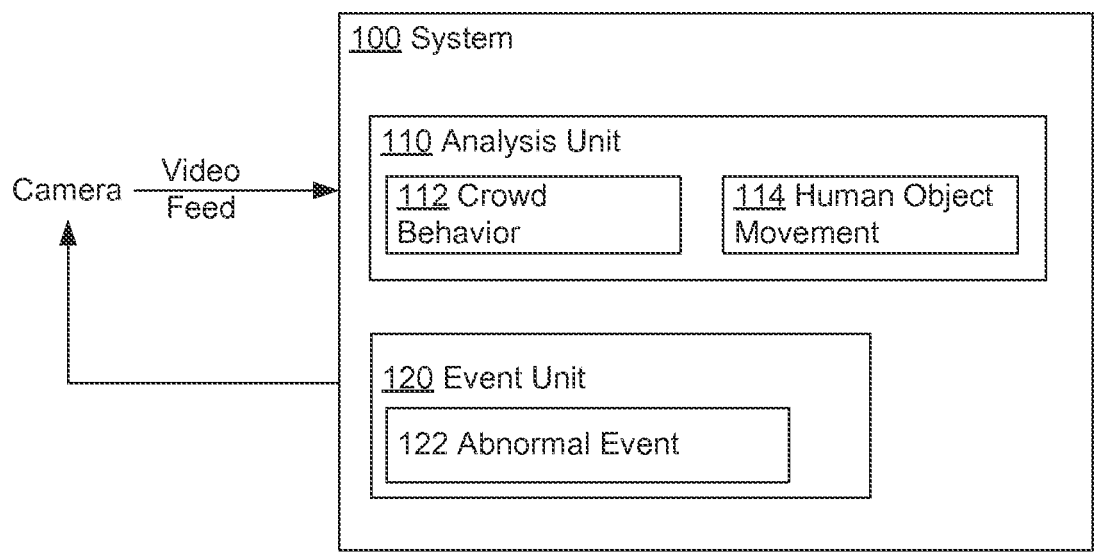
FIG. 1 is an example block diagram of a system to scan a face of a video feed.

Referring now to the drawings, FIG. 1 is an example block diagram of a system 100 to scan a face of a video feed. The system 100 may include a microprocessor, a controller, a memory module or device, a notebook computer, a desktop computer, an all-in-one system, a server, a network device, a wireless device, a storage device, a surveillance device such as a camera or sensor, or any other type of device capable of controlling a camera.

The system 200 is shown to include an analysis unit 110 and an event unit 120. The analysis and event units 110 and 120 may include, for example, a hardware device including electronic circuitry for implementing the functionality described below, such as control logic and/or memory. In addition or as an alternative, the analysis and event units 110 and 120 may be implemented as a series of instructions encoded on a machine-readable storage medium and executable by a processor.

The analysis unit 110 may analyze crowd behavior 112 in a video feed based on movement 114 of a human object identified in the video feed. The event unit 120 may trigger an abnormal event 122 if the movement 114 of the human object deviates from the analyzed crowd behavior 112. A camera may scan a face of the human object, if the abnormal event 122 is triggered. The analysis and event units 110 and 120 are described in more detail below with respect to FIG. 2.

Figure 2:
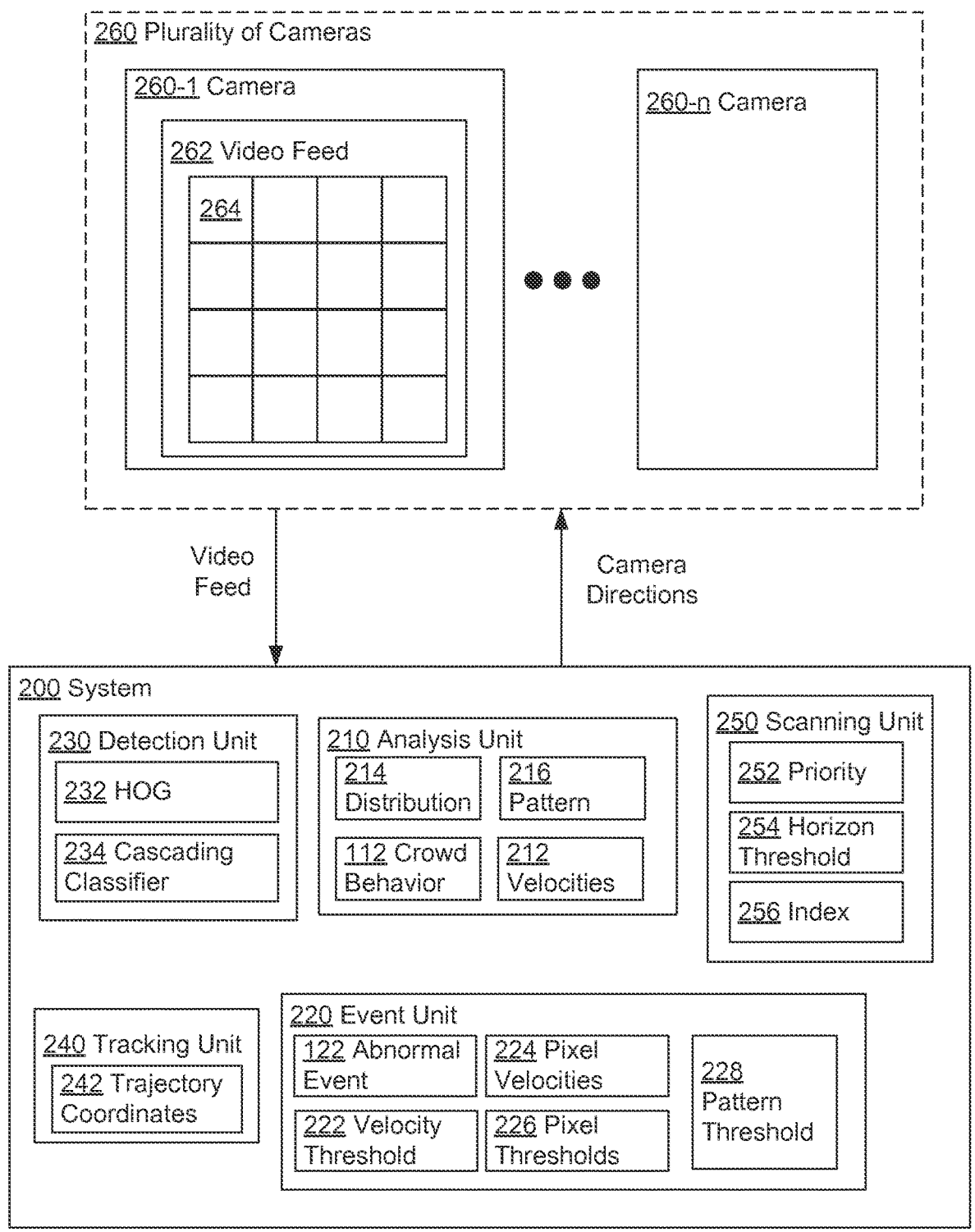
FIG. 2 is another example block diagram of a system to scan a face of a video feed.

FIG. 2 is another example block diagram of a system 200 to scan a face of a video feed. The system 200 may include a microprocessor, a controller, a memory module or device, a notebook computer, a desktop computer, an all-in-one system, a server, a network device, a wireless device, a storage device, a surveillance device such as a camera or sensor, or any other type of device capable of controlling a camera.

The system 200 of FIG. 2 may include at least the functionality and/or hardware of the system 100 of FIG. 1. For example, the system 200 is shown to include an analysis unit 210 and an event unit 220. The analysis unit 210 of the system 200 of FIG. 2 may include at least the functionality and/or hardware of the analysis unit 110 of the system 100 of FIG. 1 and the event unit 220 of the system 200 of FIG. 2 may include at least the functionality and/or hardware of the event unit 120 of the system 100 of FIG. 1.

The system 200 is further shown to include a detection unit 230, a tracking unit 240 and a scanning unit 250. The detection, tracking and scanning units 230, 240 and 250 may include, for example, a hardware device including electronic circuitry for implementing the functionality described below, such as control logic and/or memory. In addition or as an alternative, the detection, tracking and scanning units 230, 240 and 250 may be implemented as a series of instructions encoded on a machine-readable storage medium and executable by a processor.

The system 200 is also shown to interface with a plurality of cameras 260-1 to 260-n, where n is a natural number. The cameras 260 may be optical devices that record images and may be used for electronic motion picture acquisition. For example, the cameras 260 may be pan-tilt-zoom (PTZ) cameras that are capable of remote directional and zoom control.

The system 200 may receive one or more video feeds 262 from the cameras 260. The detection unit 230 may detect one or more human objects in the video feeds 262. For example, the human object may be detected by analyzing the plurality of pixels of a video frame of the video feed 262 using a Histogram of Oriented Gradient (HOG) 232 and/or a cascading classifier 234. The tracking unit 240 may track a position of the human object over a time interval to determine a trajectory. The tracking unit 240 may track a center of the human object to determine trajectory coordinates 242.

The analysis unit 210 may calculate a velocity 212 of the center of the human object. The velocity 212 may include at least one of a speed and a direction of the human object. For example, if the human object comprises a plurality of pixels, a center-most pixel of the plurality of the pixels may be used to track the velocity 212 of the human object. The tracking unit 240 may track a plurality of the human objects in the video feed 262.

The analysis unit 210 may determine the crowd behavior 112 based on a plurality of velocities 212 of the plurality of human objects. In one example, the analysis unit 210 may determine a probability distribution 214 based on the plurality of velocities 212, such as a normal distribution. The event unit 222 may trigger the abnormal event 122 if an observed velocity 212 is greater than a velocity threshold 222 number of standard deviations from a mean of the probability distribution 214. For example, the velocity threshold 222 may be three. Thus, a resulting velocity 212 that is greater than three standard deviations would trigger the abnormal event 122. For instance, a person may panic and start running down a hallway, due to a terrorist act, accident, or the like. This person may be recognized as a human object and their velocity may be measured and compared to the distribution 214 to determine a number of standard deviations.

In another example, the analysis unit 210 may aggregate the plurality of velocities 212 to determine a pattern 216 for the plurality of pixels positions 264 across the video frame during a normal state. The normal state may reflect a time period during which no abnormal events are occurring. The event unit 220 may trigger the abnormal event 122 if the crowd behavior is significantly different from the pattern 216 at more than a pattern threshold number 228 (e.g. 10% or 25% of pixel positions 264) of the plurality of pixel positions 264. For example, the analysis unit 210 may observe a pattern 216 where human objects are pacing back and forth, such as near a train stop. If one or more humans started running, this pattern 216 may be broken and replaced by randomness, or a different pattern, such as a radial pattern or human objects only flowing in one direction. This change may be reflected at more than the pattern threshold 228 number of pixel positions 264.

Further, the analysis unit 210 may dynamically calculate the average velocity vector 224 for at least one of the pixel positions 264 between adjacent video frames during the normal state. The event unit 220 may trigger the abnormal event 122 if an observed velocity of the human object at the at least one pixel position 264 exceeds the average velocity 224 of the at least one pixel position 264 by a pixel threshold 226 for the at least one pixel position 264. For example, if the video feed 262 is capturing a major walkway and a minor walkway, the average velocity 224 for the pixel positions 264 along the major walkway may be based on a greater number of observed human objects and/or different human object behavior.

As a result, the average velocity 224 for the pixel positions 264 along the major walkway may be different than that of the minor walkway. Similarly, the pixel threshold 226 for the pixel positions 264 along the major walkway may be different than that of the minor walkway. For instance, the pixel thresholds 226 for the pixel positions 264 along the major walkway may span a greater range than that of the minor walkway. Thus, in some instances, a same observed velocity that may not trigger the abnormal event 122 for pixel positions 264 along the major walkway could still trigger the abnormal event 122 for pixel positions 264 along the minor walkway. Conversely, pixel positions 264 where there is no human traffic, may have even lower average velocities 224 and/or pixel threshold 226.

The scanning unit 250 may direct the camera 260 to scan a plurality of faces of the plurality of human objects in the video frame, if the abnormal event 122 is triggered. The camera 260 may pan, tile and/or zoom to scan the plurality of faces. The scanning unit 250 may direct the camera 260 to scan the plurality of faces sequentially. The scanning unit 250 may scan at least one of the plurality of faces at a higher resolution in response to the camera 260 zooming in.

In one example, the scanning unit 250 may direct the camera 260 to assign a higher priority 252 to scanning the faces of the human objects that are closer to a boundary of the video frame, in order to scan these faces before the human objects leave the field of view of the camera 260. In another example, the scanning unit 250 may direct the camera 260 to assign higher priority 252 to scanning the faces of the human objects that are less than a threshold 254 number of degrees between a line defined by the camera and the face, and the horizon, such as fifteen degrees. Also, the scanning unit 250 may direct the camera 260 to assign higher priority 252 to scanning the faces of the human objects that are further away from the camera 260. This is because a closer distance at a steeper angle may result in lower visibility of the human object's face.

Further, the scanning unit 250 may direct the camera 260 to assign a higher priority 252 to scanning a frontal-view of the faces of the human objects, in order to improve facial recognition. The scanning unit 250 may create an index 256 of scanned faces. The index 256 may include at least one of associated time and location data. The index 256 may be used to match the scanned faces with the faces of a database (not shown) via a face recognition system.

The faces may be scanned by the plurality of cameras 260-1 to 260-n in real time. For example, the scanning unit 250 may instruct the camera 260 to focus upon a center of a first human object of the plurality of human objects. Then, the scanning unit 250 may instruct the camera 260 to zoom to at least one of a height of the first human object and a maximum zoom of the camera 260 (if the zoom is limited). Next, the scanning unit 250 may instruct the camera 260 to track the first human object while a face of the first human object is scanned. Lastly, the scanning unit 250 may instruct the camera 260 to repeat the above focusing, zooming and tracking for a second human object of the plurality of human objects, after the face of the first human object is scanned.

A field of vision of at least two of the plurality of cameras 260-1 to 260-n may overlap. The priority 252 for scanning at least one of the human objects for one of the plurality of cameras 260-1 to 260-n may be based on whether the face of the at least one human object has been scanned by another of the plurality of cameras 260-1 to 260-n.

Thus, examples may provide a system for monitoring a crowd using a video surveillance camera that has pan, tilt, and zoom control. Examples may analyze crowd behavior from the surveillance video. When an abnormal event occurs, examples may enact pan, tile, and zoom controls to scan faces to create an index of people present at the event.

The faces may then be matched with enrolled faces in databases using face recognition system to obtain the identity of the faces.

Figure 3:
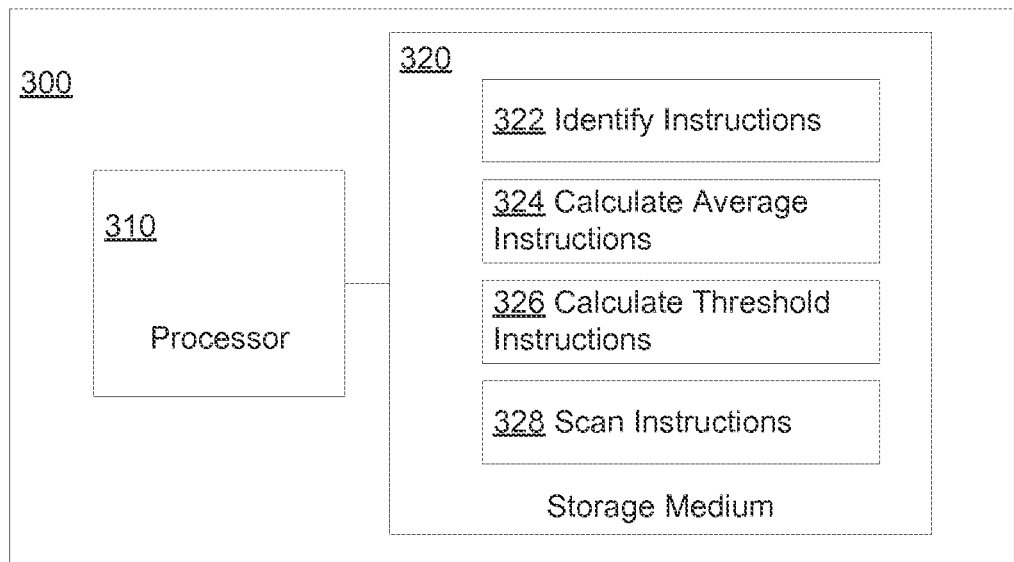
FIG. 3 is an example block diagram of a computing device including instructions for scanning a face of a video feed.

FIG. 3 is an example block diagram of a computing device 300 including instructions for scanning a face of a video feed. In the embodiment of FIG. 3, the computing device 300 includes a processor 310 and a machine-readable storage medium 320. The machine-readable storage medium 320 further includes instructions 322, 324, 326 and 328 for scanning a face of a video feed.

The computing device 300 may be included in or part of, for example, a microprocessor, a controller, a memory module or device, a notebook computer, a desktop computer, an all-in-one system, a server, a network device, a wireless device, a storage device, a surveillance device such as a camera, or any other type of device capable of executing the instructions 322, 324, 326 and 328. In certain examples, the computing device 300 may include or be connected to additional components such as memories, controllers, etc.

The processor 310 may be, at least one central processing unit (CPU), at least one semiconductor-based microprocessor, at least one graphics processing unit (GPU), a microcontroller, special purpose logic hardware controlled by microcode or other hardware devices suitable for retrieval and execution of instructions stored in the machine-readable storage medium 320, or combinations thereof. The processor 310 may fetch, decode, and execute instructions 322, 324, 326 and 328 to implement scanning the face of the video feed. As an alternative or in addition to retrieving and executing instructions, the processor 310 may include at least one integrated circuit (IC), other control logic, other electronic circuits, or combinations thereof that include a number of electronic components for performing the functionality of instructions 322, 324, 326 and 328.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for scanning the face of the video feed.

Figure 4:
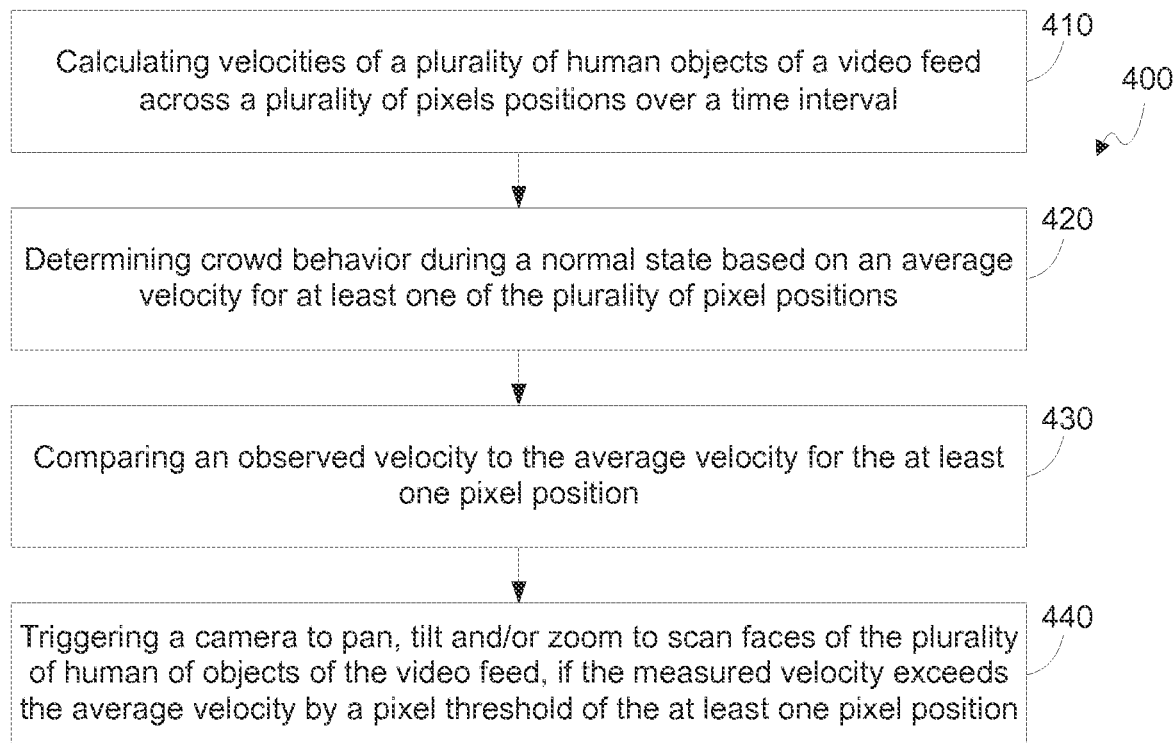
FIG. 4 is an example flowchart of a method for scanning a face of a video feed.

Moreover, the instructions 322, 324, 326 and 328, when executed by a processor (e.g., via one processing element or multiple processing elements of the processor) can cause the processor to perform processes, such as, the process of FIG. 4. For example, the identify instructions 322 may be executed by the processor 310 to identify trajectories of a plurality of human objects across a plurality of pixel positions for a plurality of frames of a video feed. The calculate average instructions 324 may be executed by the processor 310 to calculate an average velocity vector for the plurality of pixel positions based on the trajectories.

The calculate threshold instructions 326 may be executed by the processor 310 to calculate a plurality of pixel thresholds for each of the plurality of pixel positions based on the average velocity vectors. The scan instructions 328 may be executed by the processor 310 to scan faces of the plurality of human objects if a measured velocity vector for at least one of the plurality of human objects exceeds the pixel threshold for the associated pixel position.

The faces may be scanned via a plurality of the PTZ cameras (not shown) in real time. A field of vision of at least two of the plurality of PTZ cameras may overlap. A priority for scanning at least one of the human objects for one of the plurality of PTZ cameras may be based on whether the face of the at least one human object has been scanned by another of the plurality of PTZ cameras.

FIG. 4 is an example flowchart of a method 400 for scanning a face of a video feed. Although execution of the method 400 is described below with reference to the system 200, other suitable components for execution of the method 400 can be utilized, such as the system 100. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 410, the system 200 calculates velocities 212 of a plurality of human objects of a video feed 262 across a plurality of pixels positions 264 over a time interval. Then, at block 420, the system 200 determines crowd behavior 112 during a normal state based on an average velocity 224 for at least one of the plurality of pixel positions 264. Next, at block 430, the system 200 compares an observed velocity of the human object at the at least one pixel position 264 to the average velocity 224 for the at least one pixel position 264.

Lastly, at block 440, the system 200 triggers a camera 260 to at least one of pan, tilt and zoom to scan faces of the plurality of human of objects of the video feed 262, if the observed velocity exceeds the average velocity 224 by a pixel threshold 226 of the at least one pixel position 264. The triggering at block 440 may include, for example, focusing at a center of a first human object of the plurality of human objects and zooming to a height of the first human object or a maximum zoom of the camera 260 (if the zoom is limited). The triggering at block 440 may further include tracking the first human object while a face of the first human object is scanned and repeating the focusing, zooming and tracking for a second human object of the plurality of human objects, after the face of the first human object is scanned.

We claim:

1. A system, comprising:
   a processor; and
   a memory to store instructions that, when executed by the processor, cause the processor to:
   determine a plurality of velocities corresponding to movements of a plurality of human objects identified in a video feed, wherein the plurality of velocities comprise a given velocity corresponding to the movement of a given human object of the plurality of human objects;
   determine a probability distribution based on the plurality of velocities;
   trigger an abnormal event in response to the given velocity corresponding to a threshold number of standard deviations from a mean of the probability distribution; and
   control a camera in response to the triggering of the abnormal event to scan a face of the given human object.

2. The system of claim 1, wherein the instructions, when executed by the processor, further cause the processor to:
   track a position of the given human object over a time interval to determine a trajectory; and track the given human object to determine trajectory coordinates.

3. The system of claim 1, wherein the instructions, when executed by the processor, further cause the processor to:
aggregate the plurality of velocities to determine a pattern for a plurality of pixel positions across a video frame of the video feed during a normal state; and
trigger the abnormal event in response to a crowd behavior observed in the video feed being significantly different from the pattern at more than a pattern threshold number of the plurality of pixel positions.

4. The system of claim 1, wherein the instructions, when executed by the processor, further cause the processor to:
detect the given human object by analyzing a plurality of pixels of a video frame using at least one of a Histogram of Oriented Gradient (HOG) and a cascading classifier.

5. The system of claim 1, wherein the instructions, when executed by the processor, further cause the processor to:
direct the camera to scan a plurality of faces of the plurality of human objects in response to the abnormal event being triggered, wherein the camera uses at least one of pan, tilt and zoom to scan the plurality of faces;
direct the camera to scan the plurality of faces sequentially; and
scan a face of the plurality of faces corresponding to the given human object at a higher resolution in response to the camera zooming.

6. The system of claim 5, wherein the instructions, when executed by the processor, further cause the processor to:
direct the camera to assign higher priority to scanning the faces of the plurality of faces closer to a boundary of a video frame;
direct the camera to assign higher priority to scanning the faces of the plurality of faces less than a threshold number of degrees between a line from the camera to a face of the given human object and a horizon;
direct the camera to assign higher priority to scanning the faces of the plurality of faces further away from the camera; or
direct the camera to assign a higher priority to scanning a frontal-view of at least the given human object.

7. The system of claim 1, wherein the instructions, when executed by the processor, further cause the processor to:
create an index of scanned faces, the index to include at least one of associated time and location data; and
use the index to match the scanned faces with faces of a database via a face recognition system.

8. A method, comprising:
determining a plurality of velocities corresponding to movements of a plurality of human objects identified in a video feed, wherein the plurality of velocities comprise a given velocity corresponding to the movement of a given human object of the plurality of human objects;
determining a probability distribution based on the plurality of velocities;
triggering an abnormal event in response to the given velocity corresponding to a threshold number of standard deviations from a mean of the probability distribution; and
controlling a camera in response to the triggering of the abnormal event to scan a face of the given human object.

9. The method of claim 8, wherein the triggering further includes:
focusing at a center of the given human object;
zooming to at least one of a height of the given human object and a maximum zoom of the camera;
tracking the given human object while a face of the given human object is scanned; and
repeating the focusing, zooming and tracking for a second human object of the plurality of human objects, after the face of the given human object is scanned.

10. A non-transitory computer-readable storage medium storing instructions that, when executed by a processor of a device, cause the processor to:
determine a plurality of velocities corresponding to movements of a plurality of human objects identified in a video feed, wherein the plurality of velocities comprise a given velocity corresponding to the movement of a given human object of the plurality of human objects;
determine a probability distribution based on the plurality of velocities;
trigger an abnormal event in response to the given velocity corresponding to a threshold number of standard deviations from a mean of the probability distribution; and
control a camera in response to the triggering of the abnormal event to scan a face of the given human object.

11. The non-transitory computer-readable storage medium of claim 10, wherein:
a plurality of faces of the plurality of human objects are scanned via a plurality of pan, tilt and zoom (PTZ) cameras in real time, and
the instructions, when executed by the processor, cause the processor to determine a priority for scanning at least one of the human objects for one PTZ camera of the plurality of PTZ cameras based on whether a face of the at least one human object of the plurality of human objects has been scanned by another PTZ camera of the plurality of PTZ cameras.

* * * * *